(12) United States Patent
Ko et al.

(10) Patent No.: US 11,770,278 B2
(45) Date of Patent: **\*Sep. 26, 2023**

(54) REFERENCE SIGNAL HAVING VARIABLE STRUCTURE

(71) Applicant: LG ELECTRONICS INC., Seoul (KR)

(72) Inventors: Hyunsoo Ko, Seoul (KR); Kijun Kim, Seoul (KR); Eunsun Kim, Seoul (KR); Suckchel Yang, Seoul (KR)

(73) Assignee: LG ELECTRONICS INC., Seoul (KR)

( \* ) Notice: Subject to any disclaimer, the term of this patent is extended or adjusted under 35 U.S.C. 154(b) by 53 days.

This patent is subject to a terminal disclaimer.

(21) Appl. No.: 17/979,527

(22) Filed: Nov. 2, 2022

(65) Prior Publication Data

US 2023/0046109 A1 Feb. 16, 2023

Related U.S. Application Data (63) Continuation of application No. 17/573,140, filed on Jan. 11, 2022, now Pat. No. 11,539,562, which is a continuation of application No. 16/926,030, filed on
(Continued)

(51) Int. Cl.
*H04L 27/26* (2006.01)
*H04L 5/00* (2006.01)
*H04W 72/0446* (2023.01)
*H04W 72/21* (2023.01)

(52) U.S. Cl.
CPC ......... *H04L 27/2602* (2013.01); *H04L 5/0048* (2013.01); *H04L 5/0051* (2013.01); *H04L 27/2613* (2013.01); *H04W 72/0446* (2013.01); *H04W 72/21* (2023.01); *H04L 5/0007* (2013.01); *H04L 27/2626* (2013.01)

(58) Field of Classification Search
CPC ............... H04L 5/0048; H04L 5/0051; H04W 72/0413; H04W 72/0446; H04L 5/0007; H04L 27/2613; H04L 27/2626
See application file for complete search history.

(56) References Cited

U.S. PATENT DOCUMENTS 9,084,238 B2 7/2015 Gao et al.
10,313,168 B2 6/2019 You et al.
(Continued)

FOREIGN PATENT DOCUMENTS

CN 101873615 A 10/2010
CN 105144817 A 12/2015
(Continued)

OTHER PUBLICATIONS

Huawei, et al., "Discussion on frame structure for NR", 3GPP TSG RAN WG1 Meeting #85, R1-164032, May 2016, 9 pages.
(Continued)

*Primary Examiner* — Hashim S Bhatti
(74) *Attorney, Agent, or Firm* — LEE HONG DEGERMAN KANG WAIMEY (57) ABSTRACT

A method for transmitting a data demodulation reference signal (DMRS) in a wireless communication system and a device therefor are disclosed. To this end, a basic DMRS is transmitted via the first OFDM symbol in a data transmission region of a predetermined subframe, and an additional DMRS is transmitted in the predetermined subframe in accordance with a level determined by a transmission environment, wherein the basic DMRS is characterized by being transmitted via the first OFDM symbol in the data transmission region of the predetermined subframe regardless of a transmission link, the structure of the subframe, and the transmission environment.

8 Claims, 10 Drawing Sheets

Related U.S. Application Data (63) Jul. 10, 2020, now Pat. No. 11,258,562, which is a continuation of application No. 16/065,113, filed as application No. PCT/KR2017/008081 on Jul. 27, 2017, now Pat. No. 10,771,212.

(60) Provisional application No. 62/405,254, filed on Oct. 7, 2016, provisional application No. 62/371,865, filed on Aug. 8, 2016.

(56) References Cited

U.S. PATENT DOCUMENTS

| | | | |
|---|---|---|---|
| 10,420,088 | B2 | 9/2019 | Ang et al. |
| 2011/0142076 | A1 | 6/2011 | Ko et al. |
| 2012/0314667 | A1 | 12/2012 | Taoka et al. |
| 2013/0039332 | A1 | 2/2013 | Nazar et al. |
| 2015/0230211 | A1 | 8/2015 | You et al. |
| 2017/0041948 | A1 | 2/2017 | Cheng et al. |
| 2018/0212733 | A1* | 7/2018 | Khoryaev et al. .... H04W 72/23 |
| 2019/0007248 | A1 | 1/2019 | Takeda et al. |
| 2019/0036661 | A1* | 1/2019 | Ko et al. ........... H04W 72/0446 |
| 2019/0037554 | A1* | 1/2019 | Gao et al. ............. H04W 72/23 |
| 2019/0158331 | A1* | 5/2019 | Pawar et al. ....... H04L 27/2605 |
| 2020/0344024 | A1 | 10/2020 | Ko et al. |
| 2022/0131671 | A1 | 4/2022 | Ko et al. |

FOREIGN PATENT DOCUMENTS

| | | |
|---|---|---|
| CN | 105900479 A | 8/2016 |
| JP | 2011077647 A | 4/2011 |
| JP | 2014529227 A | 10/2014 |
| JP | 2015133621 A | 7/2015 |
| KR | 1020110043493 A | 4/2011 |
| KR | 1020140056334 A | 5/2014 |
| KR | 1020140061439 A | 5/2014 |
| KR | 1020160055095 A | 5/2016 |
| WO | 2014051322 A1 | 4/2014 |

OTHER PUBLICATIONS

Japan Patent Office Application Serial Number 2019-507110, Notice of Allowance dated Sep. 29, 2020, 3 pages.

LG Electronics, "Discussion on DMRS density and structure to handle high Doppler case", 3GPP TSG RAN WG1 Meeting #83, R1-156894, Nov. 2015, 15 pages.

Ntt Docomo, Inc., "Initial views on frame structure for NR access technology," 3GPP TSG-RAN WG1 #84bis, R1-163112, Apr. 2016, 7 pages.

PCT International Application Number PCT/KR2017/008081, Written Opinion Of The International Searching Authority dated Nov. 20, 2017, 11 pages.

The State Intellectual Property Office of the People's Republic of China Application Serial Number 201780043187.5, Office Action dated Nov. 4, 2020, 13 pages.

U.S. Appl. No. 16/065,113, Office Action dated Oct. 22, 2019, 9 pages.

Zte, et al., "Discussion on Design of Reference Signals for NR MIMO", 3GPP TSG RAN WG1 Meeting #85, R1-165037, May 2016, 4 pages.

* cited by examiner

| 0 | 1 | 2 | 3 | 4 | 5 | 6 | 7 | 8 | 9 | 10 | 11 |
|---|---|---|---|---|---|---|---|---|---|---|---|
| G1 | G1 | G2 | G2 | G1 | G1 | G2 | G2 | G1 | G1 | G2 | G2 |

(A)

| 0 | 1 | 2 | 3 | 4 | 5 | 6 | 7 | 8 | 9 | 10 | 11 |
|---|---|---|---|---|---|---|---|---|---|---|---|
| G1 | G2 | G1 | G2 | G1 | G2 | G1 | G2 | G1 | G2 | G1 | G2 |

REFERENCE SIGNAL HAVING VARIABLE STRUCTURE

CROSS-REFERENCE TO RELATED APPLICATIONS

This application is a continuation of U.S. Pat. Application No. 17/573,140, filed on Jan. 11, 2022, which is a continuation of U.S. Pat. Application No. 16/926,030, filed on Jul. 10, 2020, now U.S. Pat. No. 11,258,562, which is a continuation of U.S. Pat. Application No. 16/065,113, filed on Oct. 15, 2018, now U.S. Pat. No. 10,771,212, which is the National Stage filing under 35 U.S.C. 371 of International Application No. PCT/KR2017/008081, filed on Jul. 27, 2017, which claims the benefit of U.S. Provisional Application Nos. 62/371,865, filed on Aug. 8, 2016, and 62/405,254, filed on Oct. 7, 2016, the contents of which are all hereby incorporated by reference herein their entirety.

TECHNICAL FIELD

Following description relates to a method of transmitting and receiving a reference signal having a structure variable according to a system status in a wireless communication system and an apparatus therefor.

BACKGROUND ART

Recently, standardization for a mobile communication technology is arriving at the study on 5G mobile communication after passing through 4G mobile communication technologies such as LTE and LTE-A. In 3GPP, the 5G mobile communication is referred to as NR (new radio).

According to current NR system design requirements, it is able to see that there are considerably divergent requirements. For example, a frequency band used by the NR ranges from 700 MHz to 70 GHz, a system bandwidth ranges from 5 MHz to 1 GHz, moving speed has a range ranging from 0 km/h to 500 km/h, and environment for the NR includes indoor, outdoor, a large cell, and the like. In particular, the NR requires supporting in various situations.

In the various requirements existing situation, the most common design direction is to design a system in consideration of a poorest situation among the various situations. This can be identically applied to a transmission of a DMRS (demodulation reference signal) corresponding to a reference signal used for decoding data and/or control information.

DISCLOSURE OF THE INVENTION

Technical Problem

However, if a signal is transmitted with a single pattern under the assumption of the extreme circumstances, it is very inefficient in terms of resource efficiency. On the contrary, if an NR DMRS including various patterns is designed, it may have a problem that implementation complexity increases.

In order to solve the problem, a method of configuring a basic DMRS and an additional DMRS by classifying a DMRS and a method of transmitting and receiving a variable RS using the basic DMRS and the additional DMRS are explained in the following.

And, a method of using an RS for decoding control information to decode data in a specific situation is explained as well.

Technical Solution

To achieve these and other advantages and in accordance with the purpose of the present invention, as embodied and broadly described, according to one embodiment, a method of transmitting a data modulation reference signal (DMRS) in a wireless communication system includes transmitting a basic DMRS via the first OFDM symbol within a data transmission region of a prescribed subframe, and transmitting an additional DMRS in the prescribed subframe according to a level determined in accordance with transmission environment. In this case, the basic DMRS can be transmitted via the first OFDM symbol within the data transmission region of the prescribed subframe irrespective of a transmission link, a subframe structure, and transmission environment.

The basic DMRS can be transmitted via the first OFDM symbol within a common data transmission region common to both a case that the data transmission region of the prescribed subframe starts with a downlink data transmission region and a case that the data transmission region of the prescribed subframe starts with an uplink data transmission region.

The prescribed subframe transmits a downlink control channel via the first OFDM symbol, transmits an uplink control channel via the last OFDM symbol, and may have a structure transmitting data between a region in which the downlink control channel is transmitted and a region in which the uplink control channel is transmitted.

The additional DMRS can include a first type DMRS using the whole of REs (resource elements) of a single OFDM symbol and a second type DMRS using a partial RE in a specific time region.

A transmission count of the first type DMRS is determined in the prescribed subframe according to the level determined in accordance with the transmission environment and the same number of OFDM symbols may exist between the first type DMRS as many as the determined transmission count and the basic DMRS.

The first type DMRS can be transmitted via an OFDM symbol appearing after an OFDM symbol in which the basic DMRS is transmitted.

The second type DMRS can be transmitted in a prescribed OFDM symbol with an equal frequency space.

The level determined according to the transmission environment can be signaled by RS density information.

The RS density may increase as Doppler Effect is getting intensified, delay spread is getting worse, and an MCS level is higher.

The method can further include repeatedly transmitting an RS for estimating a channel change in the prescribed subframe.

To further achieve these and other advantages and in accordance with the purpose of the present invention, according to a different embodiment, a data modulation reference signal (DMRS) transmission device in a wireless communication system includes a transceiver configured to transmit a basic DMRS via the first OFDM symbol within a data transmission region of a prescribed subframe and transmit an additional DMRS in the prescribed subframe according to a level determined in accordance with transmission environment, and a processor configured to control the transceiver to transmit the basic DMRS and the additional DMRS. In this case, the processor controls the transceiver to transmit the basic DMRS via the first OFDM symbol within the data transmission region of the prescribed subframe irrespective of a transmission link, a subframe structure, and transmission environment.

The processor can control the basic DMRS to be transmitted via the first OFDM symbol within a common data transmission region common to both a case that the data transmission region of the prescribed subframe starts with a downlink data transmission region and a case that the data transmission region of the prescribed subframe starts with an uplink data transmission region.

The prescribed subframe transmits a downlink control channel via the first OFDM symbol, transmits an uplink control channel via the last OFDM symbol, and may have a structure transmitting data between a region in which the downlink control channel is transmitted and a region in which the uplink control channel is transmitted.

The additional DMRS can include a first type DMRS using the whole of REs (resource elements) of a single OFDM symbol and a second type DMRS using a partial RE in a specific time region.

The processor can determine a transmission count of the first type DMRS in the prescribed subframe according to the level determined in accordance with the transmission environment and control the same number of OFDM symbols to be existed between the first type DMRS as many as the determined transmission count and the basic DMRS.

ADVANTAGEOUS EFFECTS

According to the present invention, it is able to transmit a DMRS without losing efficiency in a situation in which various requirements exist.

It will be appreciated by persons skilled in the art that the effects that could be achieved with the present disclosure are not limited to what has been particularly described hereinabove and the above and other effects that the present disclosure could achieve will be more clearly understood from the following detailed description.

BEST MODE

Mode for Invention

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As mentioned in the foregoing description, one embodiment of the present invention proposes a method of transmitting a data modulation reference signal (DMRS) in a wireless communication system. To this end, one embodiment of the present invention proposes that a basic DMRS is transmitted via a first OFDM symbol within a data transmission region of a prescribed subframe and an additional DMRS is transmitted in the prescribed subframe according to a level determined according to transmission environment.

In this case, the basic DMRS is transmitted via the first OFDM symbol within the data transmission region of the prescribed subframe irrespective of a transmission link, a subframe structure, and transmission environment. The reason why the basic DMRS is transmitted via the first OFDM symbol within the data transmission region of the prescribed subframe is to help data early decoding and measure/cancel inter-cell interference.

As mentioned in the foregoing description, the basic DMRS corresponds to a reference signal which is always transmitted irrespective of a link (i.e., DL/UL/SL), numerology (subcarrier spacing, OFDM symbol duration), a transmission layer (rank 1~N), a deployment scenario (indoor, outdoor), velocity (0~500 km/h), a TBS size, and the like. In NR, assume that the basic DMRS is positioned at a forepart of a data region of a subframe. In NR, early decoding of data is an important requirement in designing the NR system. If a DMRS is transmitted prior to a data signal, it is able to promptly obtain channel estimation information which is mandatorily required for performing data decoding.

When a position of a basic DMRS is considered, it is also necessary to consider a subframe structure used in the NR. In the NR system, it is anticipated that a TDD scheme is to be mainly used due to a pilot contamination problem caused by the introduction of massive MIMO.

Figure 1:
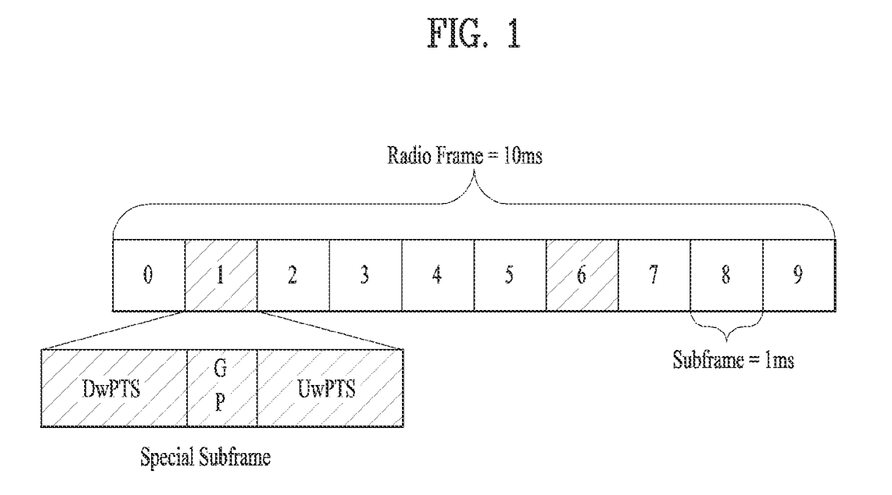
FIG. 1 is a diagram illustrating a TDD radio frame structure.

FIG. 1 is a diagram illustrating a TDD radio frame structure.

A TDD radio frame shown in FIG. 1 corresponds to a radio frame structure of 4G LTE system. In the following description, unless there is a special citation, it may use the radio frame structure.

A TDD radio frame of LTE system has a length of 10 ms and includes 10 subframes. In particular, one subframe has a length of 1 ms. In FIG. 1, a special subframe such as a subframe 1 and a subframe 6 corresponds to a subframe for DL/UL switching. A DL pilot time slot (DwPTS) has a length of 3 to 12 OFDM symbols, a guard period (GP) has a length of 1 to 10 OFDM symbols, and a UL pilot time slot (UpPTS) has a length of 1 to 2 OFDM symbols.

In the 4G LTE radio frame structure shown in FIG. 1, 1 TTI has a length of 1 ms and corresponds to one subframe.

Figure 2:
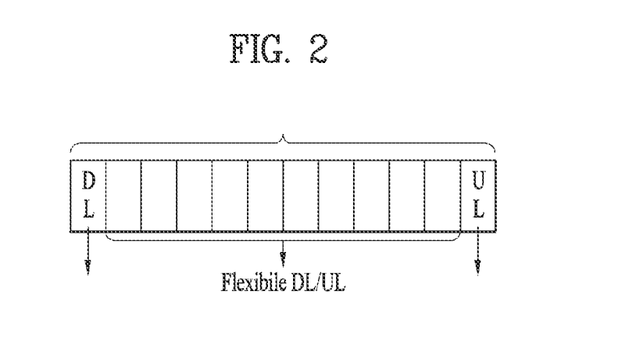
FIG. 2 is a diagram illustrating a subframe structure of an NR system according to one embodiment of the present invention.

FIG. 2 is a diagram illustrating a subframe structure of an NR system according to one embodiment of the present invention.

When communication is performed using a TDD scheme in 5G mobile communication system, as shown in FIG. 2, the present invention proposes to use a subframe structure sequentially including a DL-dedicated section, a UL/DL variable section, and a UL-dedicated section. By doing so, it is able to prevent a response for a signal transmitted by a link in one direction from being excessively delayed. If a variable section is configured according to a system status, it is able to perform flexible communication.

The subframe structure shown in FIG. 2 can be referred to as a self-contained frame structure. In the self-contained frame structure, a DL-dedicated section is used for transmitting DL control channel information, a variable section is used for transmitting a data channel, and a UL-dedicated section can be used for transmitting UL control channel.

When a position of a basic DMRS is considered, it is also necessary to consider the following. In NR, a frame structure should be designed to be commonly used by DL/UL/SL. In order to estimate a channel of an interference signal received from an adjacent cell or an adjacent link, a DLRS position of DL/UL/SL is matched within a subframe.

Figure 3:
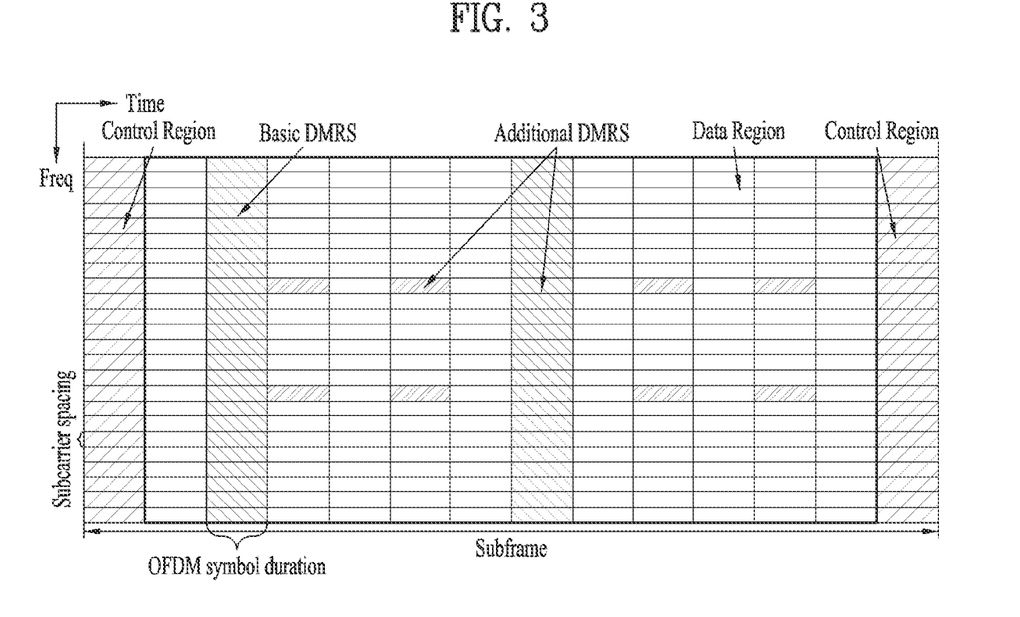
FIGS. 3 and 4 are diagrams for explaining a method of transmitting a basic DMRS and an additional DMRS according to one embodiment of the present invention.
Figure 4:
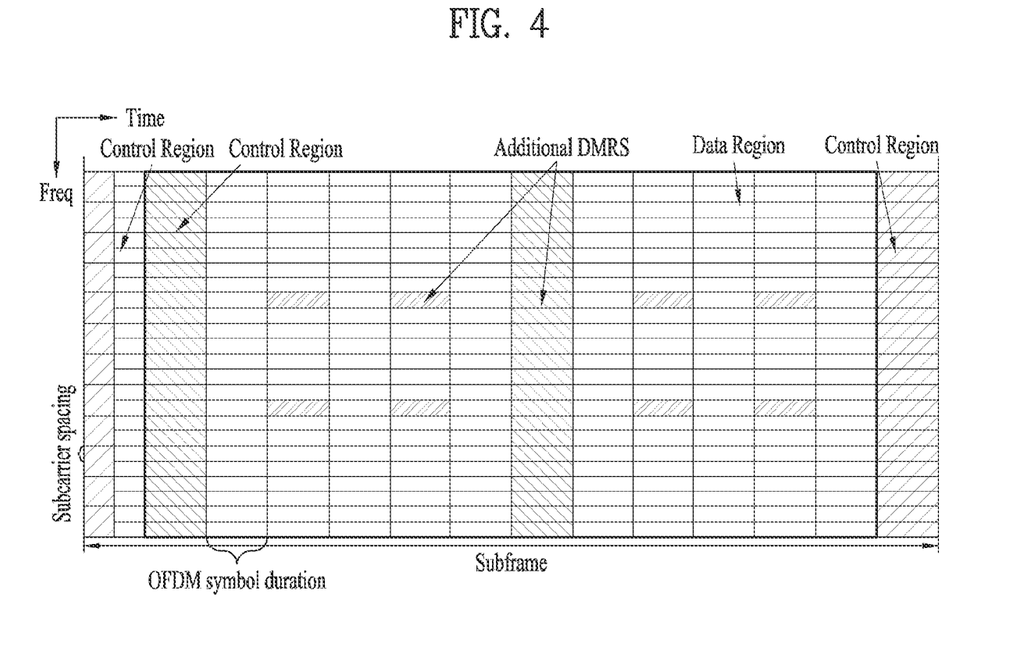

FIGS. 3 and 4 are diagrams for explaining a method of transmitting a basic DMRS and an additional DMRS according to one embodiment of the present invention.

As shown in FIG. 3 and FIG. 4, in a subframe structure considered in NR, a starting point of a DL data region and a starting point of a UL data region may vary according to a length of a DL control region and the existence of a guard period.

For example, if DL data is transmitted immediately after a first OFDM symbol in which a control channel is transmitted, a data region may start from a second OFDM symbol. If UL data is transmitted immediately after a first OFDM symbol in which a control channel is transmitted, a second OFDM symbol is used as a guard period and a data region may start from a third OFDM symbol.

Since a starting point of a DL data region and a starting point of a UL data region vary, it is preferable to assign a basic DMRS to the first symbol among OFDM symbols commonly used for transmitting data in the DL data region and the UL data region. FIG. 3 illustrates a case that a basic DMRS is transmitted in the third OFDM symbol according to the abovementioned principle.

Meanwhile, an OFDM symbol length of a control region and an OFDM symbol length of a data region may vary. In this case, similar to the abovementioned case, it may assign a basic DMRS to the first OFDM symbol among OFDM symbols commonly used for transmitting data in the DL data region and the UL data region after an OFDM symbol occupied by DL control and guard time. For example, FIG. 4 illustrates a case that both DL control and guard time are configured in the first OFDM symbol. In this case, a basic DMRS can be transmitted in the second OFDM symbol.

An additional DMRS can be positioned at a specific position of a data region. The additional DMRS can be classified into two types described in the following.
(1) Type-additional DMRS: A DMRS using a part of an RE (resource element).
(2) Type-additional DMRS: A DMRS using the whole of an OFDM symbol.

When an additional DMRS is used in a unit of an OFDM symbol (in case of using the type-2 additional DMRS), the additional DMRS can be positioned at a location where the number of OFDM symbols appearing after an OFDM symbol used as a basic DMRS is identical or similar to the number of OFDM symbols appearing after an OFDM symbol used as an additional DMRS. For example, as shown in FIG. 3, when there are 12 OFDM symbols in a data region and a basic DMRS is positioned at the second OFDM symbol, an additional DMRS can be assigned to the seventh OFDM symbol. As a different example, when there are 12 OFDM symbols in a data region and there are one basic DMRS and two additional DMRSs, if the basic DMRS and the additional DMRSs are assigned to the first, the fifth, and the ninth OFDM symbol, respectively, the number of OFDM symbols appearing after each DMRS may become similar. By doing so, it may have a merit in that a DMRS is able to reflect a channel estimation change well.

Meanwhile, unlike the aforementioned embodiment, according to a different embodiment of the present invention, if an additional DMRS is used in a unit of an OFDM symbol (in case of using the type-2 additional DMRS), the additional DMRS can be positioned at an OFDM symbol contiguous with an OFDM symbol used as a basic DMRS. For example, if a basic DMRS is positioned at the second OFDM symbol, an additional DMRS can be assigned to the third OFDM symbol. By doing so, it may have a merit in that the number of resources of DMRS can be increased to increase the number of antenna ports in multi-antenna transmission or increase the number of UEs transmitted at the same time.

Additional DMRSs are distinguished from each other by a level according to the number of REs of an added DMRS and the number of REs of the added DMRS (i.e., additional DMRS level) can be controlled according to transmission environment. Among multiple additional DMRS levels, it is preferable to make one of the multiple additional DMRS levels correspond to a case of transmitting a basic RS only. In particular, an additional DMRS level 0 may correspond to a case of transmitting a basic RS only.

As shown in FIGS. 3 and 4, an additional DMRS in an RE unit (type-1 DMRS) can be arranged with an equal interval. In general, the additional DMRS in the RE unit defines the number of APs identical to the number of APs defined in a basic DMRS. However, when a phase change amount is measured between OFDM symbols using the additional DMRS in the RE unit and an amount of change is similar in all APs, it may define additional DMRSs of the number of APs less than the number of APs defined in the basic DMRS.

In this case, a basic DMRS can also be referred to as a fundamental DMRS, a primary DMRS, or the like and an additional DMRS can also be referred to as a high quality RS, a high performance RS, a supplemental DM-RS, a secondary DM-RS, an add-on DMRS, or the like. And, an RS usable for decoding data/control information can be referred to as a different term rather than a DMRS.

Method of Changing Density of DMRS

In order to change density of a DMRS, it may be able to maintain a legacy RS and add an additional RS according to on-demand. For example, it may add the additional RS in high MCS when Doppler is intensified, delay spread is getting worse, or according to an MCS level.

As a method of changing density of a DMRS, it may have variability that transmits more RSs or less RS on demand to a user allowing density to be changed according to capability of a receiving end. For example, if a receiving end is able to perform analog beamforming, it may ask the receiving end to transmit less RS on demand in response to RS transmission assuming Omni direction reception.

When paging, a random access response, system information, and the like are transmitted on a channel, density of an RS is fixed on the channel. When information is transmitted to a specific UE on a channel, RS density variability can be applied to the channel.

It may be able to define RS density control information from among grant messages for channel decoding. In particular, information on RS density (use of default density, density increase, density decrease) used in a currently transmitted channel can be provided in a form described in the following.

Information on RS density (default, density increase/decrease) to be used in a channel
Additional DMRS level information
Information on additional DMRS type
Triggering message for reporting amount of change of channel When a UE performs short term measurement (CSI-RS), the UE can report not only CSI but also an amount of change of a channel (of time and frequency). The report on the amount of change of a channel may become an indicator indicating whether to change RS density. And, the UE may report an RS density variability request message.

When the UE reports the CSI (RI/PMI/CQI), it may be able to configure the UE to report information on an additional DMRS level preferred by the UE. The preferred additional DMRS level corresponds to an additional DMRS level capable of obtaining the optimized throughput when the UE receives PDSCH of MCS corresponding to the CQI. When the UE calculates the CSI, it may be able to configure the UE to reflect DMRS RE overhead which is added according to a level of an additional DMRS.

If a transmission layer increases, it may add an additional RS to a legacy RS.

It is preferable to basically use a basic DMRS and an additional DMRS in a common control channel or a data region indicated by a common control message.

When data is indicated by a UE-specific control channel or a UE-specific control message, DMRS density is variably managed in a subframe. To this end, it may be able to configure a DMRS-related indicator in a control message. DMRS density is indicated for PDSCH and PUSCH (e.g., DCI, according to a format, RRC).

A UE performing analog Rx beamforming can ask DMRS density to be changed.

Figure 5:
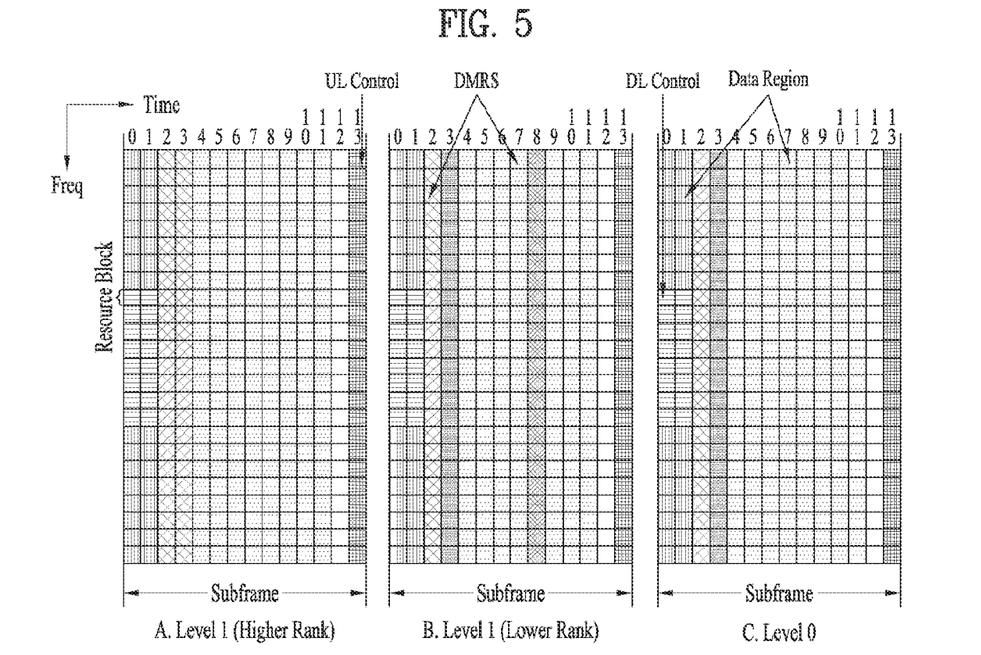
FIGS. 5 and 6 are diagrams for explaining a method of controlling DMRS transmission density according to one embodiment of the present invention.
Figure 6:
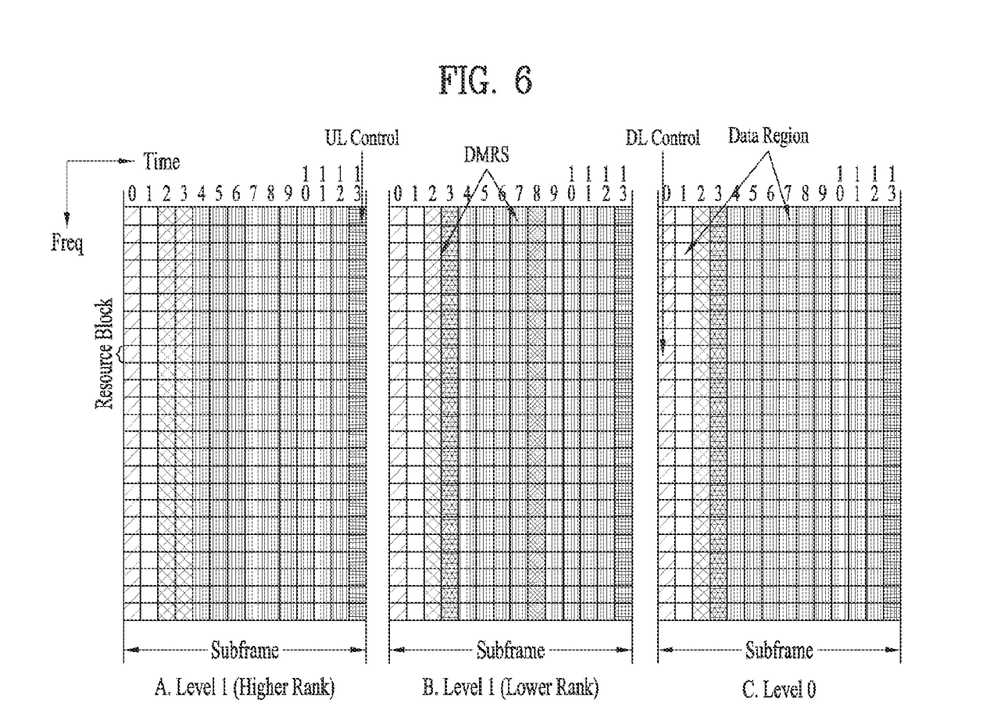

FIGS. 5 and 6 are diagrams for explaining a method of controlling DMRS transmission density according to one embodiment of the present invention.

Specifically, FIG. 5 is a diagram for explaining a DMRS transmission structure for transmitting DL data and FIG. 6 is a diagram for explaining a DMRS transmission structure for transmitting DL data.

As shown in FIGS. 5 and 6, a type-2 additional DMRS is classified into a level 0 and a level 1 according to overhead and the DMRS is used according to a level. In the present example, a DMRS position of a UL transmission region is matched with a DMRS position of a DL transmission region according to a level of the type-2 additional DMRS. In particular, a position at which an additional DMRS is transmitted is the same irrespective of DL/UL data transmission. In particular, it is preferable to transmit a basic/additional DMRS at the same position irrespective of DL/UL data transmission.

Since the level 1 increases overhead compared to the level 0, the level 1 can be applied for the purpose of enhancing channel estimation performance, when higher rank transmission or lower rank transmission is performed. The level 0 is targeting lower rank transmission having low RS overhead.

As a different example, in FIGS. 5 and 6, A. level 1 (higher rank) is used for the purpose of enhancing channel estimation performance when lower rank transmission is performed and B. level 1 (lower rank) can be utilized as a pattern for a higher rank.

The structures shown in FIGS. 5 and 6 are an exemplary frame structure. In the present example, a case of using two OFDM symbols in a DL control region has been assumed. It is able to transmit DL data in a region rather than the DL control region bay passing through DL data transmission time or guard time.

Designating Level Capable of Performing Interpolation to Improve Channel Estimation Performance According to one embodiment of the present invention, it may assume a QCL condition for a DMRS transmitted by multi-level. For example, if QCL is assumed among a plurality of DMRSs transmitted in a single subframe, a channel estimated from each of a plurality of the DMRSs can be utilized for interpolation. If QCL condition is assumed in multiple subframes, it is able to perform interpolation using a multi-subframe level. When a mini-subframe is defined in a subframe and a DMRS is transmitted according to a mini-subframe, if QCL of a mini-subframe level is assumed, it may be able to perform interpolation between mini-subframes.

A QCL condition may indicate a time domain resource unit capable of performing interpolation using such an expression as a subframe group or a multi-subframe group, etc.

Reference Signal Structure for Measuring Channel State Change

Similar to legacy LTE, in case of using a CRS periodically transmitted with a prescribed OFDM symbol interval or a CSI-RS periodically transmitted in a unit of a subframe, it may be able to measure time-varying characteristic of a channel. On the contrary, in NR, such a single-beamformed (there is no change of a beam in a unit of time and frequency) RS as a CRS transmitted in a unit of several OFDM symbols is not defined.

Since the NR aims for a frame structure capable of dynamically changing DL/UL and a transmission beam in a unit of an OFDM symbol and a unit of a subframe, it is difficult to transmit a periodic CSI-RS in a unit of a subframe. Hence, it is difficult to use the periodic CSI-RS. And, it is difficult to perform Doppler measurement using one shot transmission.

Although an RS for measuring a periodically transmitted beam is introduced, if the RS is not transmitted with a very short period, it is difficult to measure an amount of change of time-varying characteristic using the RS for measuring the beam.

Hence, it is necessary to design a channel measurement reference signal (e.g., CSI-RS, SRS, etc.) of the NR to be appropriate for measuring a channel time-varying state change.

A structure of a signal capable of measuring an amount of change of a channel state is described in the following.

Figure 7:
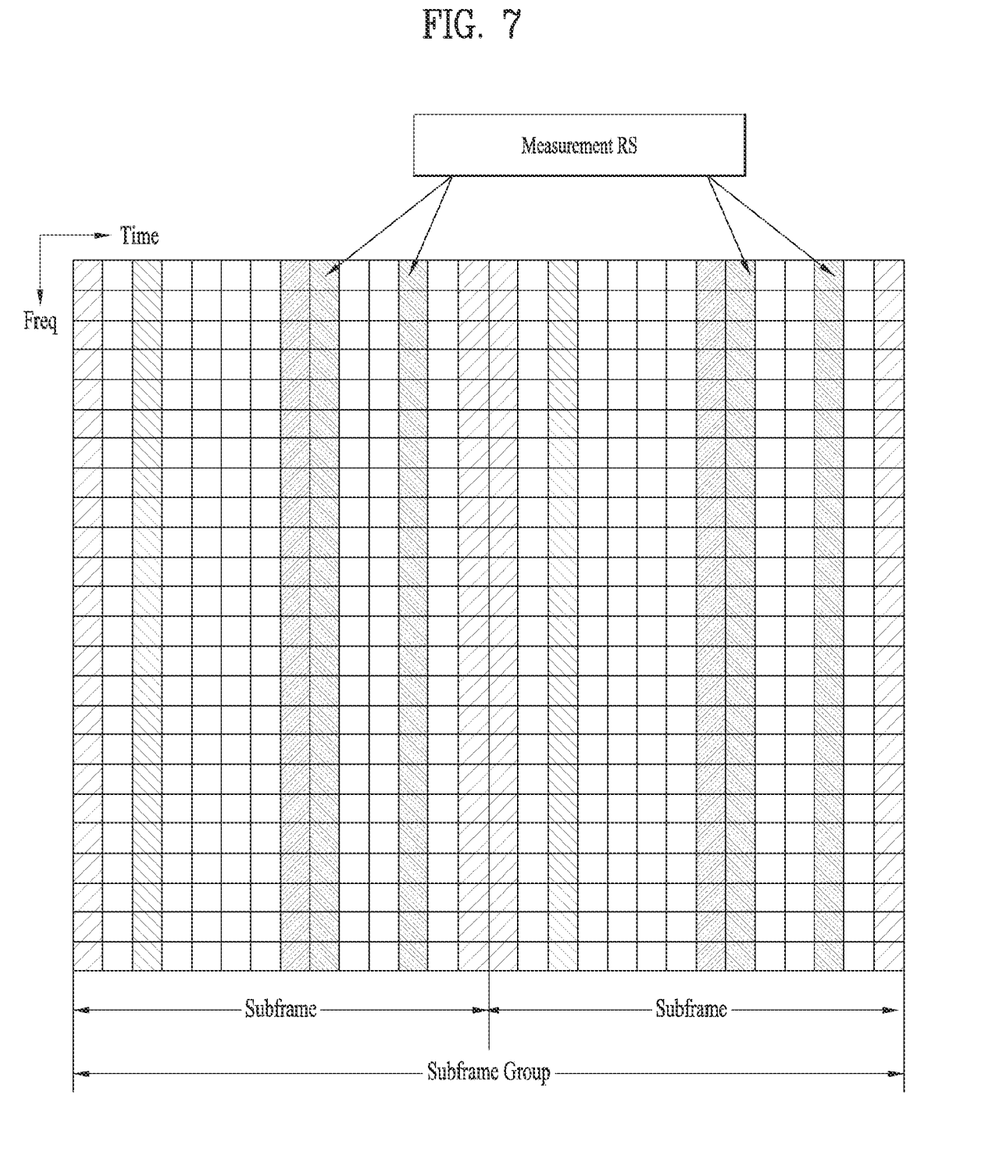
FIG. 7 is a diagram illustrating a concept of a multi-shot measurement RS according to one embodiment of the present invention.

FIG. 7 is a diagram illustrating a concept of a multi-shot measurement RS according to one embodiment of the present invention.

A multi-shot CSI-RS or a multi-shot SRS including no beamforming change can be transmitted as shown in FIG. 7. The multi-shot CSI-RS or the multi-shot SRS can be transmitted over a multi-shot (a multi-shot transmitted in a unit of adjacent subframes or a unit of several subframes) in a subframe. It may define a message (e.g., N-subframe group) on the premise that there is no change in a beamforming coefficient. And, it may consider a repeatedly transmitted structure in a single OFDM symbol.

When an aperiodic CSI-RS is transmitted, CSI is measured, or CSI reporting is triggered via DCI, a base station indicates whether the CSI-RS corresponds to a single shot CSI-RS or a multi-shot CSI-RS. If the base station transmits the multi-shot CSI-RS, a UE reports a channel change amount or a preferred additional DMRS level.

When an aperiodic SRS transmission is triggered via DCI, the base station indicates whether the SRS corresponds to a single shot SRS or a multi-shot SRS. Or, the base station indicates the number of continuously transmitting the SRS with the same precoding scheme.

In addition, in order to efficiently measure interference, a CSI-IM (interference measurement) resource corresponding to a resource for specifying interference is configured as a multi-shot resource. The multi-shot CSI-IM resource can be defined in a manner of being matched with a CSI-RS resource by one to one. In particular, the base station can designate how many times the CSI-RS resource and the CSI-IM resources appear via DCI. On the other hand, the base station may be able to use a scheme of individually designating how many times the CSI-RS resource appears and how many times the CSI-IM resource appears via DCI.

Meanwhile, according to a different embodiment of the present invention, as a method of providing a variable RS structure, a method of sharing an RS by a control channel and a data channel is explained.

Method of Sharing RS by Control Channel and Data Channel

As mentioned in the foregoing description, NR system considers performing TDM on a downlink control channel and a downlink/uplink data channel. Basically, an RS for demodulating a control channel is defined and a DMRS for demodulating a data channel can be defined, respectively. If an RS is defined for each of channels, RS overhead can be considerably increased.

In order to reduce the RS overhead, it may consider methods of sharing a control channel RS or a data DMRS in a control channel and a data channel. However, it is necessary to note that the RS sharing is not always beneficial in one embodiment of the present invention. For example, the control channel RS defines the limited number of antenna ports. If the limited number of antenna ports is applied to the data channel, it may set a limit on the maximum transmission rank of the data channel. Consequently, the limited number of antenna ports may become an element that restricts capacity. And, the RS of the control channel may correspond to a UE-specific RS or a non-UE-specific RS. If the RS of the control channel is transmitted as a non-UE -specific RS, since it is difficult to perform beamforming on a specific user, it is difficult to expect a beam gain.

According to one embodiment of the present invention, the abovementioned RS sharing can be permitted only when a prescribed condition is satisfied. For example, 1. a user transmitting information requiring a non-high data rate,
2. when UE-specific spatial channel information is not obtained or when obtained spatial channel information is not valid,
3. a user prefers open-loop transmission such as fast moving environment, the abovementioned conditions can be included in the prescribed condition.

In particular, the present embodiment proposes that a data channel shares an RS defined in a control channel. In this case, it may assume that the RS of the control channel corresponds to a UE group-specific RS. In this case, as mentioned in the foregoing description, the number of data transmission layers can be restricted by the RS of the control channel. And, it may be difficult to expect UE specific beamforming.

In case of sharing the RS of the control channel, it may not use an RS of a DMRS region. The DMRS region ca ne utilized for transmitting additional data. As a different embodiment, it may be able to assign an additional RS to a data region in which the RS of the control channel is shared.

In case of using an additional RS, it may have a merit in that it is able to use a basic transmission (or a fall back scheme) without considerably increasing RS overhead compared to a single OFDM symbol DMRS. This scheme can be considered as being similar to the aforementioned basic DMRS/additional DMRS scheme.

Figure 8:
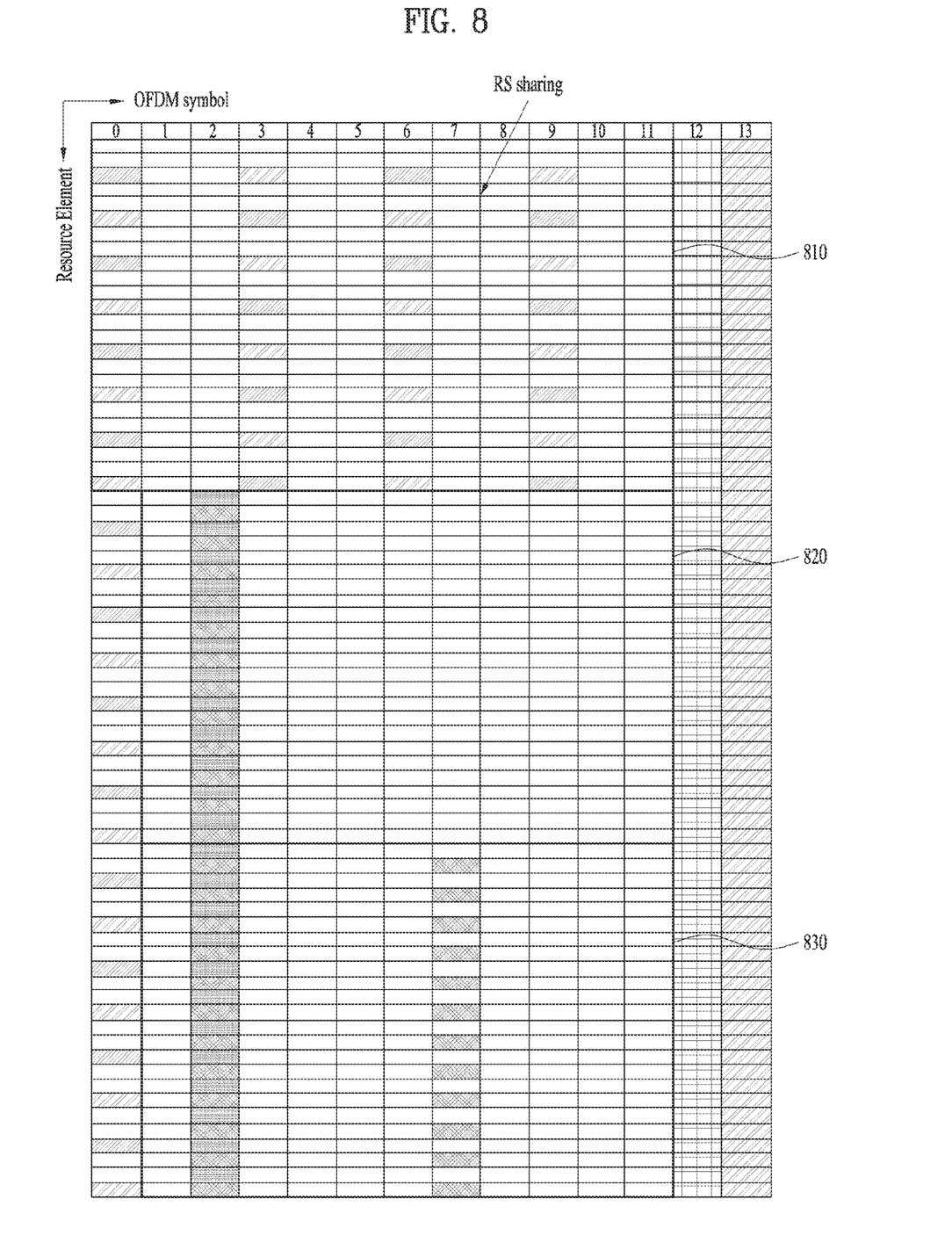
FIG. 8 is a diagram illustrating a method for control information and data to share an RS according to one embodiment of the present invention.

FIG. 8 is a diagram illustrating a method for control information and data to share an RS according to one embodiment of the present invention.

In FIG. 8, an RB 810 corresponds to an RB performing the aforementioned RS sharing and an RB 820 and an RB 830 correspond to normal RBs not using the RS sharing.

When a user or a user group shares an RS of a control channel, it is preferable to additionally transmit an RS similar or identical to the RS of the control channel in a data channel section for the user or the user group. In particular, FIG. 8 illustrates a case that an RS of a pattern identical to the RS of the control channel is transmitted.

The abovementioned structure can operate in a manner of being indicated. To this end, it may define an indicator in contents of a control signal.

Or, when a user or a user group shares an RS of a control channel in a data channel, it is able to configure a control channel RS to be always additionally transmitted in a data channel section for the UE or the UE group.

It is preferable for a base station to indicate an RS to be used to a UE. For example, the base station can indicate an RS defined in a control channel or an RS defined in a DMRS region to the UE.

Or, an RS in use can be determined in accordance with an attribute of a shared channel transmitted to a UE. For example, it may be able to share an RS of a control channel in a data channel indicated by DCI detected by RNTI. In this case, the RNTI can be associated with RNTI of DCI that transmits system information or random access response.

Based on the aforementioned description, a transmission structure of an NR DMRS is explained in detail in the following.

According to one embodiment of the present invention, an NR DMRS allocates a resource to make the maximum N (=8) number of antenna ports (APs) to be transmitted in a single OFDM symbol. In this case, multiplexing between APs can be performed using FDM-CDM scheme. In a unit resource block, it may have 2 or 3 REs per AP. It may have the maximum 2N (=16) REs or 3N (=24) REs per RB. The number of effective REs per AP can be differently determined according to the number of layers.

Design Criteria

The maximum spectral efficiency required by NR system is 30 bps/Hz (DL) and 15 bps/Hz (UL). The maximum spectral efficiency is identical to spectral efficiency of 3GPP LTE-A. LTE-A has achieved modulation of 64QAM, the number of layers of 8 (DL) and 4 (UL), and requirements of 30 bps/Hz (DL) and 15 bps/Hz (UL). Similarly, it is preferable for the NR system to achieve the maximum number of layers of 8 (DL) and 4 (UL) in consideration of spectral efficiency requirement. It is able to increase the number of antenna ports in accordance with the increase of base station antennas. Assume that the maximum number of layers capable of being transmitted by the base station corresponds to 16. And, assume that the maximum number of layers capable of being received by the base station in UL also corresponds to 16.

Assume the number of point-to-point transmission layers
SU transmission: maximum 8 (DL), maximum 4 (DL)
MU transmission: maximum 4 (DL), maximum 4 (DL)
Assume the maximum number of layers capable of being transmitted by base station
Maximum 16 (DL), 8 (UL)

In the present design, an NR DMRS is designed under the assumption described in the following.
Maximum 8 antenna ports are supported according to UE
Maximum 16 antenna ports capable of being transmitted at the same time are supported
A resource is configured to make the maximum 8 APs to be determined in one OFDM symbol
An antenna port (AP) has at least 2 RE energy or 3 RE energy
If 16 REs are used for 8 APs, 2 REs are used for an AP. If 24 REs are used, 3 REs are used for an AP. In the present design, assume that a resource block is configured by 16 REs or 24 REs corresponding to a multiple of 8.

Method of Performing Multiplexing With Single OFDM Symbol

When a plurality of APs are multiplexed with a single OFDM symbol, it may use a FDM method using a different frequency resource for an AP and a CDM method separately using a code resource for the same resource.

Figure 9:
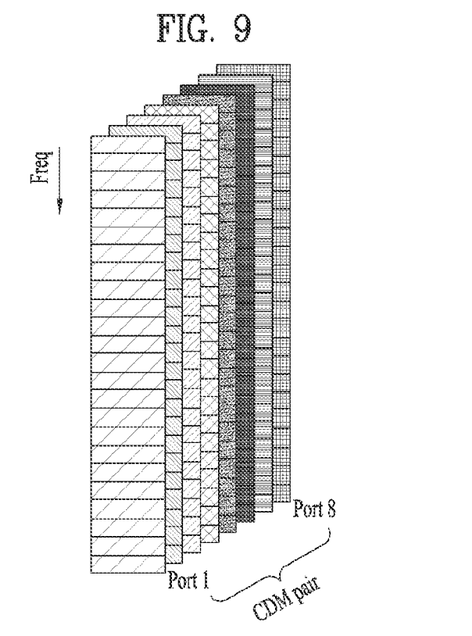
FIG. 9 is a diagram for explaining a method of spreading a DMRS to the N number of REs using a CDM scheme and a method of transmitting a DMRS using 8 orthogonal codes according to one embodiment of the present invention.

FIG. 9 is a diagram for explaining a method of spreading a DMRS to the N number of REs using a CDM scheme and a method of transmitting a DMRS using 8 orthogonal codes according to one embodiment of the present invention.

In particular, as an example of using an orthogonal code for the N number of REs, all APs share a scrambling sequence (e.g., a PN sequence, CAZAC, etc.) of a length N and 8 orthogonal sequences (e.g., DFT, Hadamard) each of which has a length N are allocated to an AP.

Figure 10:
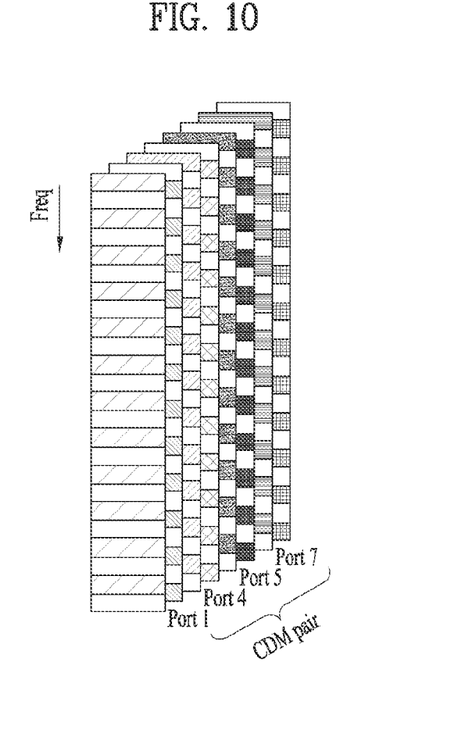
FIG. 10 is a diagram for explaining a method of using FDM and CDM via a combination of the FDM and the CDM according to one embodiment of the present invention.

FIG. 10 is a diagram for explaining a method of using FDM and CDM via a combination of the FDM and the CDM according to one embodiment of the present invention.

FIG. 10 also illustrates an example of using a frequency resource and an orthogonal code for the N number of REs. The N number of REs are divided into even-numbered REs and odd-numbered REs and an orthogonal code is used to identify 4 APs in each group. A scrambling sequence (e.g., a PN sequence, CAZAC, etc.) of a length N used in an allocated band uses two subset sequences including an even number index and an odd number index and each of the subset sequences is shared by an AP. 4 orthogonal sequences (e.g., DFT, Hadamard) each of which has a length N/2 are allocated to an AP.

A scrambling sequence of a length N/2 used in an allocated band is identically used in two frequency resources and 4 orthogonal sequences each of which has a length N/2 are allocated to an AP.

Figure 11:
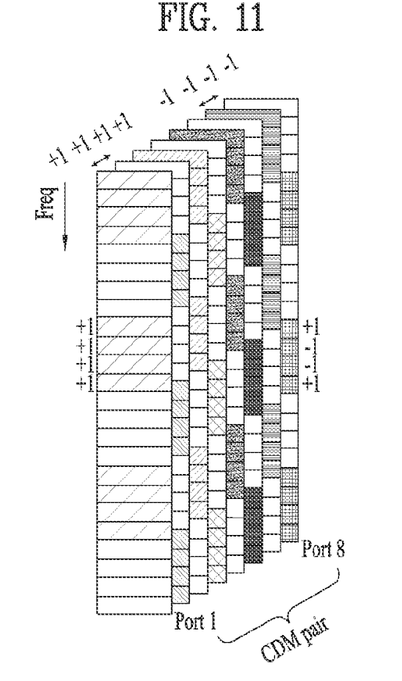
FIG. 11 is a diagram for explaining a method of using FDM and OCC via a combination of the FDM and the OCC according to one embodiment of the present invention.

FIG. 11 is a diagram for explaining a method of using FDM and OCC via a combination of the FDM and the OCC according to one embodiment of the present invention.

In particular, as an example of using a frequency resource and an orthogonal code for the N number of REs, 4 consecutive frequency resources are grouped and 4 orthogonal code resources are allocated to 4 APs in the group of the frequency resources. Another group of frequency resources is generated in adjacent 4 REs and 4 orthogonal code resources are allocated to another 4 APs. When an RB uses 4 REs, the total N/4 numbers of resource groups having 4 consecutive frequencies are generated and 4 APs use resource groups away from each other with a space of 4REs. A scrambling sequence of a length of N/4 defined in the corresponding RB is used in each of the N/4 number of frequency groups.

Figure 12:
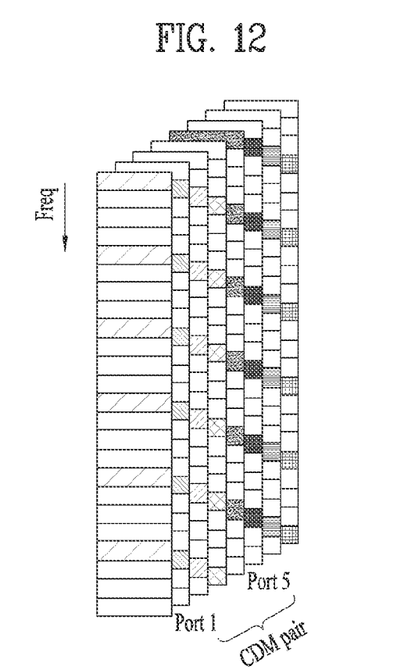
FIG. 12 is a diagram for explaining a method of using FDM and CDM via a combination of the FDM and the CDM according to a different embodiment of the present invention.

FIG. 12 is a diagram for explaining a method of using FDM and CDM via a combination of the FDM and the CDM according to a different embodiment of the present invention, The total 4 groups of frequency resources are generated by grouping frequency resources each of which has a space of 4 REs. In each of the 4 groups of frequency resources, 2 APs are distinguished from each other using an orthogonal resource.

A scrambling sequence of a length of N defined in a corresponding RB is mapped to each RE and a different scrambling sequence can be mapped between groups of frequency resources. It may use OCC-2 ([+1 +1], [+1 -1]) as two orthogonal resources.

A scrambling sequence of a length of N/4 defined in a corresponding RB is mapped to an RE belonging to a group of frequency resources and groups of frequency resources may use the same scrambling sequence as a base sequence. It may introduce a special offset sequence between the groups. It may use OCC-2 ([+1 +1], [+1 -1]) as two orthogonal resources.

Figure 13:
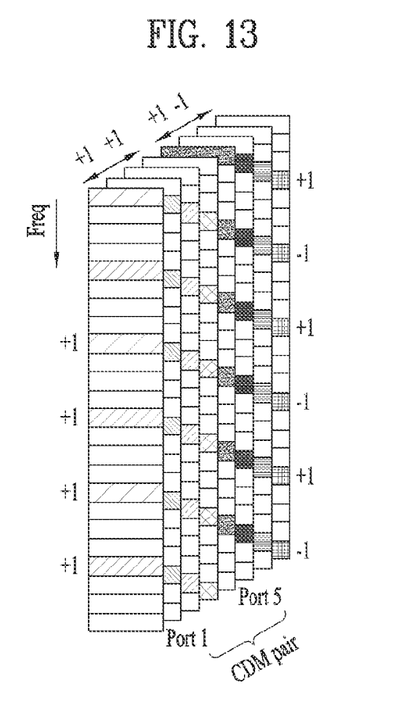
FIGS. 13 and 14 are diagrams for explaining a method of using FDM and OCC via a combination of the FDM and the OCC according to a different embodiment of the present invention.
Figure 14:
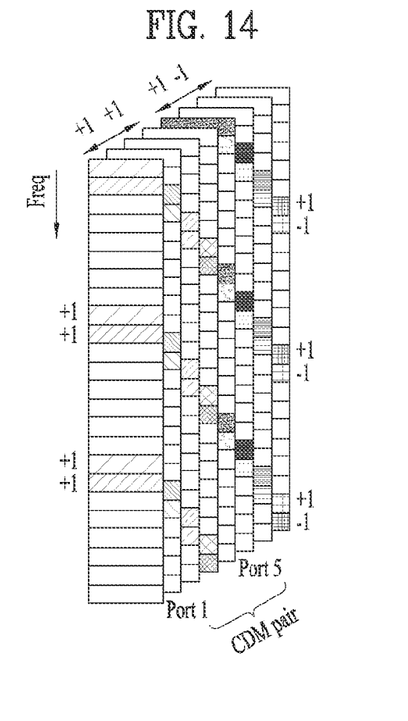

FIGS. 13 and 14 are diagrams for explaining a method of using FDM and OCC via a combination of the FDM and the OCC according to a different embodiment of the present invention.

Referring to FIG. 13, the total 4 groups of frequency resources are generated by grouping frequency resources each of which has a space of 4 REs. In each of the 4 groups of frequency resources, 2 APs are distinguished from each other using an orthogonal resource.

Referring to FIG. 14, two consecutive REs are used as an OCC application unit and the total 4 OCC groups are generated 8 REs. A scrambling sequence of a length of N/2 defined in a corresponding RB is mapped to each of the OCC groups.

Figure 15:
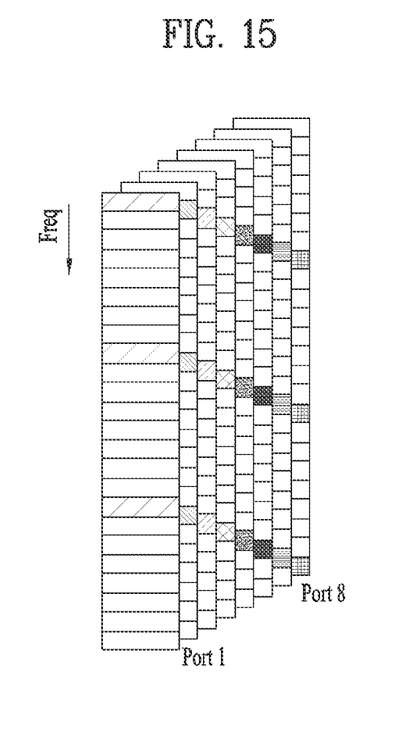
FIG. 15 is a diagram for explaining a method of using FDM and a method of configuring a space of 8 REs per AP according to a different embodiment of the present invention.

FIG. 15 is a diagram for explaining a method of using FDM and a method of configuring a space of 8 REs per AP according to a different embodiment of the present invention.

The number of REs per port can be fixed irrespective of the number of layers (e.g., N-RE / the maximum number of APs). Meanwhile, the number of REs per port may vary according to the number of layers. (e.g., Single layer: 24REs per port, Two layers: 12 REs per port, Three layers: 8REs per port, Four layers: 6REs per port, Six layers: 4REs per port, Eight layers: 3REs per port)

If there are 5 layers, a DMRS pattern for 6 layers uses 5 ports. If there are 7 layers, a DMRS pattern for 8 layers may use 7 ports.

In the foregoing description, a method of allocating a DMRS resource for maximum 8 APs has been explained. However, the method can also be used as a method of allocating a resource to APs of a smaller range. For example, if there are 4 APs, it may use a subset of the method. In case of extending the number of antenna APs (e.g., maximum 8), it may use one more OFDM symbol. For example, it is able to identify an AP by applying OCC-2 to two OFDM symbols. Table 1 in the following assumes LTE-A: 8 ports, 24 REs

TABLE 1

| Number of AP | 1 | 2 | 3 | 4 | 5 | 6 | 7 | 8 |
|---|---|---|---|---|---|---|---|---|
| RE/AP | 12 | 6,6 | 6,6,12 | 6,6,6,6 | 3,3,6,6,3 | 3,3,3,3,3,3 | 3,3,3,3,3,3,3 | 3,3,3,3,3,3,3,3 |

Sequence for CDM

In case of a legacy LTE UL DMRS, a ZC sequence is used as a base sequence and a DFT vector having a space as much as 12 is used ($\exp(j*2*pi*n*k/12)$) to apply time domain cyclic shift. Among 12 orthogonal vectors, 8 vectors are used and the vectors are repeatedly applied in a unit of 12 REs.

In a new system, when 8 orthogonal DMRS antenna ports (APs) are multiplexed with one OFDM symbol, it may consider a method of applying CDM or an OCC in frequency axis.

(1) In case of applying time domain cyclic shift, a DFT vector having a space as much as 8 ($\exp(j*2*pi*n*k/8)$) is used. This method has a merit in that an impulse response for a radio channel of each of 8 layers is arranged with the maximum space in time domain.

In particular, the method can be applied to a pattern that 8 orthogonal DMRS antenna ports are used by CDM.

As an orthogonal sequence, it may apply Hadamard-8.

In this case, when 12 REs are defined as 1 RB, if a vector of a length of 8 is arranged to 12 REs, it may have a form that a vector of 1 cycle is mapped to a part of the vector. For example, when a vector of a length of 8 corresponds to [$S_n(0)$ $S_n(1)$ $S_n(2)$ $S_n(3)$ $S_n(4)$ $S_n(5)$ $S_n(6)$ $S_n(7)$], the vector can be mapped to 12 REs in an order described in the following.

12RE mapping: [$S_n(0)$ $S_n(1)$ $S_n(2)$ $S_n(3)$ $S_n(4)$ $Sn(5)$ $S_n(6)$ $S_n(7)$ $S_n(0)$ $S_n(1)$ $S_n(2)$ $Sn(3)$]

In order to make sequences mapped to multiple RBs have a continuous phase, it may be able to configure a mapping relation according to an RB number.

TABLE 2

|  | 0 1 2 3 4 5 6 7 8 9 10 11 |
|---|---|
| Even (/Odd) number RB | [$S_n(0)$ $S_n(1)$ $S_n(2)$ $S_n(3)$ $S_n(4)$ $S_n(5)$ $S_n(6)$ $Sn(7)$ $S_n(0)$ $S_n(1)$ $S_n(2)$ $Sn(3)$] |
| Odd (/Even) number RB | [$S_n(4)$ $S_n(5)$ $S_n(6)$ $Sn(7)$ $S_n(0)$ $S_n(1)$ $S_n(2)$ $S_n(3)$ $S_n(4)$ $S_n(5)$ $S_n(6)$ $Sn(7)$] |

(2) In case of applying time domain cyclic shift, a DFT vector having a space as much as 4 ($\exp(j*2*pi*n*k/4)$) is used. This method has a merit in that an impulse response for a radio channel of each of 4 layers is arranged with the maximum space in time domain.

In particular, the method can be applied to a pattern that 4 orthogonal DMRS antenna ports are used by CDM.

As an orthogonal sequence, it may apply Hadamard-4.

When an orthogonal DMRS AP is defined using FDM and CDM, if 12 REs are defined as 1 RB, CDM is applied in a unit of 6 REs to identify 4 DMRS APs and another 4 DMRS APs can be defined by applying CDM to another 6 REs. In this case, if a vector of a length of 4 is arranged to 6 REs, similar to the aforementioned mapping, it may have a form that a vector of 1 cycle is mapped to the half of the cycle. In this case, as mentioned in the foregoing description, in order to make sequences mapped to multiple RBs have a continuous phase, it may be able to configure a mapping relation according to an RB number.

TABLE 3

|  | 0 1 2 3 4 5 6 7 8 9 10 11 |
|---|---|
| Even (/Odd) number RB | [$S_n(0) - S_n(1) - S_n(2) - S_n(3) - S_n(0) - S_n(1) -$ ] |
| Odd (/Even) number RB | [$S_n(2) - S_n(3) - S_n(0) - S_n(1) - S_n(2) - S_n(3) -$ ] |

Method of Applying FDM and CDM

If 12 REs are defined as 1 RB, CDM is applied in a unit of 6 REs to identify 4 antenna ports and another 4 antenna ports can be defined by applying CDM to another 6 REs.

Figure 16:
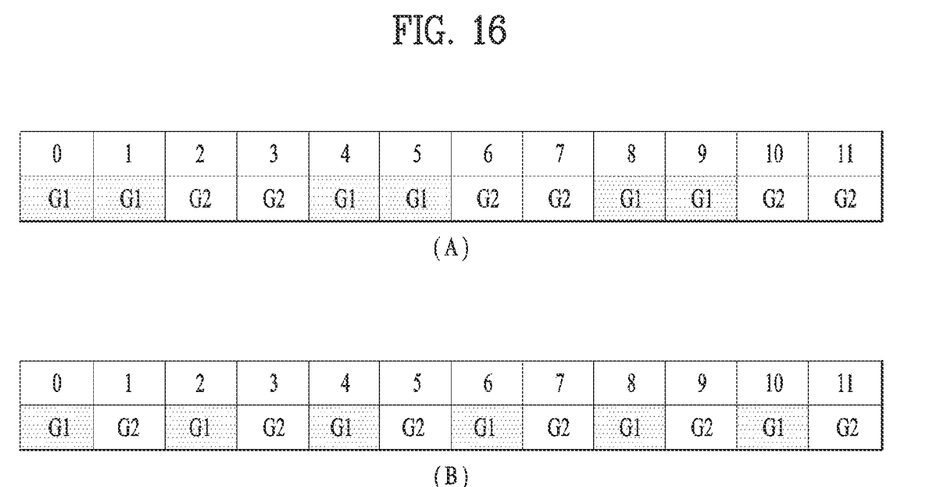
FIG. 16 is a diagram illustrating a method of applying FDM and CDM according to one embodiment of the present invention.

FIG. 16 is a diagram illustrating a method of applying FDM and CDM according to one embodiment of the present invention.

Specifically, FIG. 16 (A) illustrates a case that 2 consecutive REs are grouped and groups are arranged with a space of 2 REs. Meanwhile, FIG. 16 (B) illustrates a case that REs having a space of 2 REs are grouped.

It may be able to identify 4 antenna ports in each of 2 groups (G1, G2). In this case, it may be able to apply the aforementioned CDM code to each group.

When multi-user transmission is performed in DL transmission, a base station can allocate a DMRS port within a FDM group and a CDM group to enable multiple users to perform channel estimation. The base station can indicate a DMRS port to be used by each user. Basically, the base station designates a DMRS port used by an individual user. When a DMRS antenna port is assigned to the multiple users, if a UE is aware of information on a DMRS port used by other users, it is highly probable to improve channel estimation performance.

For example, when two DMRS ports are assigned to a UE and two sequences are selected from CDM, the UE can identify the two DMRS ports by performing averaging in a unit of 2 REs. Since it is probable that the remaining two sequences are selected from the CDM for a different UE, the UE performs averaging in a unit of 4 REs to identify two DMRS antenna ports.

It is preferable to perform averaging on REs as close as possible in consideration of frequency selectivity of a radio channel. When averaging is performed on two REs rather than 4 REs, it may be able to expect better channel estimation performance. If a base station informs a UE of multi-user multiplexing-related information or information on a length of CDM in multi-user transmission, the UE is able to adjust a unit of performing averaging when the UE estimates a channel. For example, it may be able to configure an indicator indicating either CDM-2 (use of an orthogonal resource of a length of 2) or CDM-4 (use of an orthogonal resource of a length of 4) to the UE.

Figure 17:
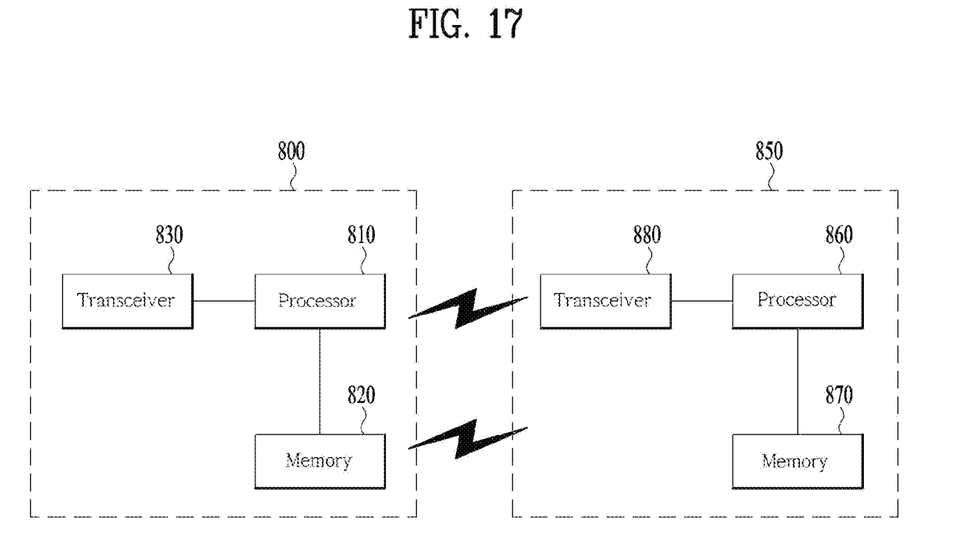
FIG. 17 is a diagram for explaining a device for performing abovementioned operations.

FIG. 17 is a diagram for explaining a device for performing abovementioned operations.

In FIG. 17, a wireless device 800 corresponds to a specific UE in the foregoing description and a wireless device 850 may correspond to a base station or an eNB.

The UE can include a processor 810, a memory 820, and a transceiver 830 and the eNB 850 can include a processor 860, a memory 870, and a transceiver 880. The transceiver 830/880 transmits/receives a radio signal and can be executed in a physical layer. The processor 810/860 is executed in a physical layer and/or a MAC layer and is connected with the transceiver 830/880. The processor 810/860 can perform a procedure of transmitting the aforementioned SS block.

The processor 810/860 and/or the transceiver 830/880 can include an application-specific integrated circuit (ASIC), a different chipset, a logical circuit, and/or a data processor. The memory 820/870 can include a ROM (read-only memory), a RAM (random access memory), a flash memory, a memory card, a storing media and/or a different storing unit. When one embodiment is executed by software, the aforementioned method can be executed by a module (e.g., process, function) performing the aforementioned function. The module can be stored in the memory 820/870 and can be executed by the processor 810/860. The memory 820/870 can be deployed to the inside or outside of the processor 810/860 an can be connected with the processor 810/860 by a well-known medium.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention.

INDUSTRIAL APPLICABILITY

The present invention can be applied not only to the NR system but also to a different wireless system in which various requirements exist.

What is claimed is:

1. A method for transmitting demodulation reference signals (DMRSs) for data in a wireless communication system, the method comprising:

transmitting a basic DMRS on a first OFDM symbol within a time domain unit; and transmitting one or more additional DMRSs on one or more second OFDM symbols located after the first OFDM symbol within the time domain unit;

wherein a position of the first OFDM symbol is variable based on mapping type of a data region related with a location of starting OFDM symbol and a length of the data region, wherein the position of the first OFDM symbol is determined as a first position or a second position within the time domain unit, wherein positions of the second OFDM symbols are determined based on a number of the second OFDM symbols and a number of OFDM symbols within the data region, and wherein the positions of the second OFDM symbols are determined regardless of determined position of the first OFDM symbol as the first position or the second position.

2. The method of claim 1, wherein a first positioned OFDM symbol, among OFDM symbols assigned for the data, is different from a first positioned OFDM symbol within the time domain unit.

3. The method of claim 1, wherein the data includes a PUSCH (Physical Uplink Shared Channel) transmitted by a user equipment (UE).

4. The method of claim 1, wherein the data includes a PDSCH (Physical downlink Shared Channel) transmitted by a network.

5. An apparatus for transmitting demodulation reference signals (DMRSs) for data in a wireless communication system, the apparatus comprising:

a transceiver configured to transmit a basic DMRS on a first OFDM symbol within a time domain unit, and to transmit one or more additional DMRSs on one or more second OFDM symbols located after the first OFDM symbol within the time do main unit;

a processor connected to the transceiver, and configured to:

determine a variable position of the first OFDM symbol based on mapping type of a data region related with a location of starting OFDM symbol and a length of the data region, wherein the position of the first OFDM symbol is determined as a first position or a second position within the time domain unit, and determine positions of the second OFDM symbols based on a number of the second OFDM symbols and a number of OFDM symbols within the data region, wherein the positions of the second OFDM symbols are determined regardless of determined position of the first OFDM symbol as the first position or the second position.

6. The apparatus of claim 5, wherein a first positioned OFDM symbol, among OFDM symbols assigned for the data, is different from a first positioned OFDM symbol within the time domain unit.

7. The apparatus of claim 5, wherein the apparatus is a user equipment (UE), and wherein the data includes a PUSCH (Physical Uplink Shared Channel) transmitted by the UE.

8. The apparatus of claim 5, wherein the apparatus is a network, and wherein the data includes a PDSCH (Physical downlink Shared Channel) transmitted by the network.

* * * * *